Dec. 15, 1953
M. CERVINO ET AL
2,662,538
TANK CONSTRUCTION
Filed Oct. 30, 1951
2 Sheets-Sheet 1
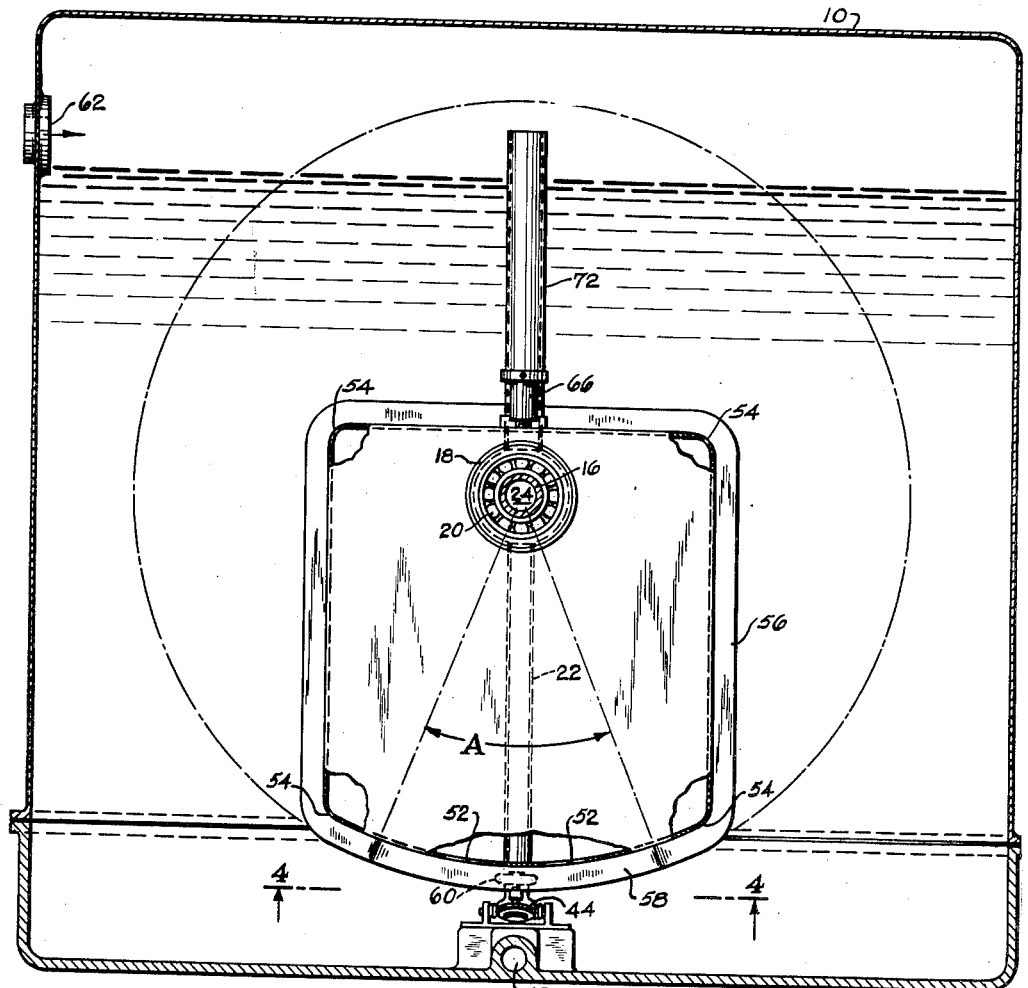
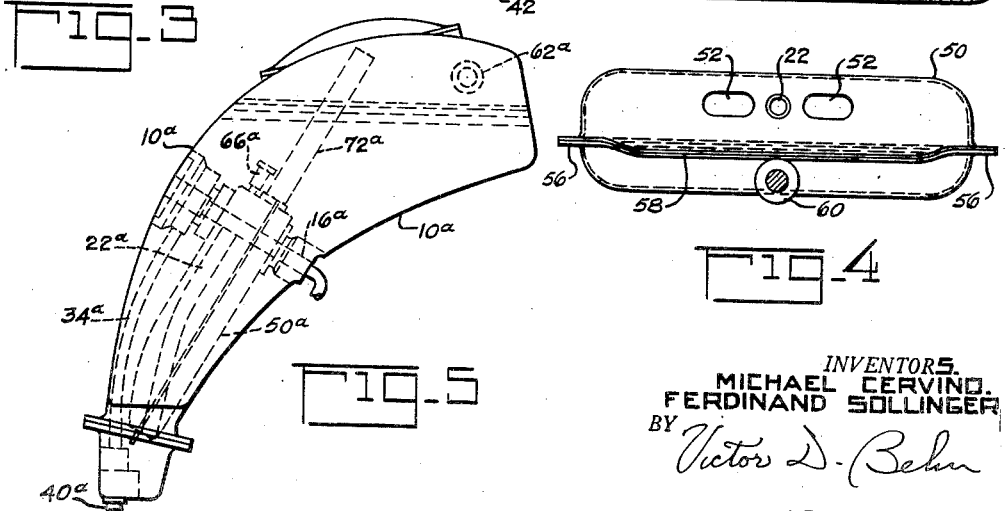
INVENTORS.
MICHAEL CERVINO.
FERDINAND SOLLINGER
BY
*Victor D. Behr*
ATTORNEY Dec. 15, 1953
M. CERVINO ET AL
2,662,538
TANK CONSTRUCTION
Filed Oct. 30, 1951
2 Sheets-Sheet 2
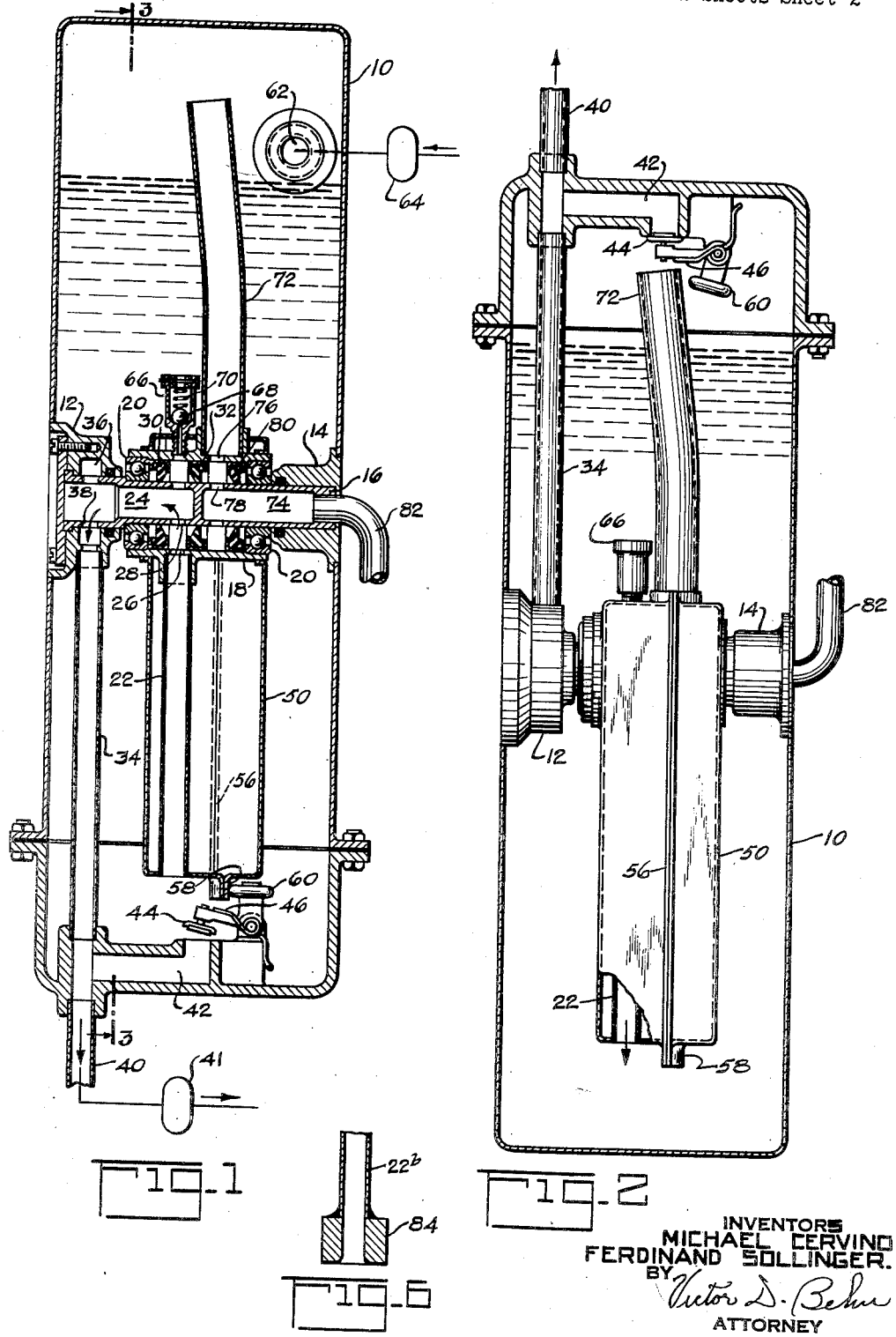
INVENTORS
MICHAEL CERVINO
FERDINAND SOLLINGER.
BY
ATTORNEY Patented Dec. 15, 1953

2,662,538

UNITED STATES PATENT OFFICE 2,662,538

TANK CONSTRUCTION

Michael Cervino and Ferdinand Sollinger, Paterson, N. J., assignors to Curtiss-Wright Corporation, a corporation of Delaware Application October 30, 1951, Serial No. 253,866

13 Claims. (Cl. 137—45)

This invention relates to tanks for liquids and is particularly directed to tanks from which a liquid is to be drawn in various positions of tilt of said tank.

An aircraft power plant generally includes fuel and lubricating oil tanks. In the case of military aircraft, it is not uncommon for such aircraft to be designed to climb and dive at angles as high as 70 and 90 degrees, respectively, to the horizontal. It obviously is essential that the power plant of such an aircraft be supplied with fuel and lubricating oil during all attitudes of aircraft operation.

An object of the present invention comprises the provision of a tiltable tank having a novel and simple structure whereby liquid can be drawn from the tank outlet in all positions of tilt of the tank. A further object of the invention comprises the provision or a tiltable tank in which a tank outlet passage always opens into the lower portion of the tank regardless of the tilt of said tank. A still further object of the invention comprises the provision of a tiltable tank with a novel pendular mounted outlet passageway which extends to and opens into the bottom of the tank regardless of the tilt of said tank.

Fuel and lubricating oil tanks are generally provided with vent openings to permit said tanks to be filled and emptied and to prevent the build-up of excessive pressure within the tank. Another object of the invention comprises the provision in a tiltable tank of a vent passageway which always communicates with the upper portion of the tank above the liquid therein regardless of the tilt of said tank. Still another object of the invention comprises the provision in a tank of a novel pendular mounted vent passageway so that said passageway always extends above the liquid in said tank.

Other objects of the invention will become apparent upon reading the annexed detailed description in connection with the drawing in which:

Fig. 1 is a sectional view through a tank embodying the invention with the tank in its normal position;

Fig. 2 is a view corresponding to Fig. 1 but with the tank inverted;

Fig. 3 is a view taken along line 3—3 of Fig. 1;

Fig. 4 is a view taken along line 4—4 of Fig. 3;

Fig. 5 is a view in elevation of a modified form of the invention; and

Fig. 6 is a fragmentary view of a further modification of the invention.

The invention has been illustrated in connection with a lubricating oil tank of an aircraft engine. As will appear however the invention is not limited to this specific use and/or to this specific liquid.

Referring now to the drawing, a lubricating oil tank 10 for an aircraft engine is provided with a pair of bosses 12 and 14 extending therein for supporting a hollow shaft-like member 16 across a central portion of said tank such that the axis of the shaft 16 is normally substantially horizontal. A sleeve 18 is journaled on the shaft 16 by means of bearings 20. A conduit 22 is secured to the sleeve 18 and extends radially therefrom. The sleeve end of the conduit 22 is in communication with a hollow portion 24 of the shaft 16 through holes 26 and 28 respectively in said sleeve and shaft. The other end of the conduit 22 opens into the interior of the tank. Seals 30 and 32 are provided between the sleeve 18 and shaft 16 so that the hollow shaft portion 24 communicates with the interior of the tank only through the open end of the conduit 22. A second conduit 34 is secured to the boss 12 and extends toward the normal bottom or lower portion of the tank. The normal upper end of the conduit 34 communicates with the hollow portion of the shaft 16 through an annulus 36 in the boss 12 and through holes 38 in said shaft. The other end of the conduit 34 is connected to an outlet conduit 40 extending from the normal lower portion of the tank through which oil is withdrawn from the tank, for example by the pump 41, and supplied to the bearing surfaces of the engine to be lubricated.

The normal lower portion of the tank 10 is also provided with a passage 42 opening directly into the interior of said tank at its normal lower portion, said passage 42 communicating directly with the tank outlet conduit 40. A valve 44 is arranged to close or open the passage 42 and a spring 46 urges said valve toward its closed position and as hereinafter described cam means are provided for normally holding said valve open.

As described, the sleeve 18 and conduit 22 are journaled on the shaft 16. In addition suitable weight means are secured to said sleeve and conduit so that the open end of the conduit 22 normally gravitates toward the lower portion of the tank by swinging about the axis of the shaft 16. In order to save weight, as is important in an aircraft installation, the oil within the tank 10 is utilized to provide at least a portion of the weight for swinging the open end of the conduit 22 toward the bottom of the tank. For this purpose, a container-like vessel 50 is eccentrically secured to the sleeve 18, said vessel being principally disposed on the side of the sleeve from which the conduit 22 extends. As illustrated, the conduit 22 preferably extends through the vessel 50. The vessel has openings 52 at the bottom and vent openings 54 adjacent its corners whereby said vessel automatically fills with oil when the tank 10 is filled. With this construction, as the tank 10 tilts about the axis of the shaft 16, the weight of the vessel 50 and the weight of the oil within said vessel act as a pendular mass to cause the open end of the conduit 22 to gravitate toward the lower portion of the tank. Thus Fig. 2 illustrates the tank 10 turned 180° about the axis of the shaft 16 (as would be the situation in the case of inverted aircraft flight). As illustrated in Fig. 2 the open end of the conduit 22 is still disposed adjacent to the lower portion of the tank 10 in spite of the 180° tilt of said tank.

When the oil within the tank 10 is displaced from the lower portion of the tank, as a result of acceleration or deceleration of the aircraft, the weight of the vessel 50 and the oil therein will cause the open end of the conduit to follow the oil within the tank. Thus the open end of the conduit 22 will always be directed in the direction of the resultant of the force of gravity and the forces acting on the oil within the tank as a result of aircraft acceleration or deceleration.

The vessel 50 has a split two-part construction with said parts each having a flange 56 along which said parts are joined together. The flanges 56 have a raised or deflected portion 58 which acts as a cam in cooperation with a cam follower 60 connected to the valve 44 for holding the valve open when the tank is in its normal position Fig. 1. The cam portion 58 of the vessel 50 is best seen in Fig. 4. The cam portion 58 subtends an angle A (Fig. 3) about the axis of the shaft 16 so that the valve 44 is held open as long as the tilt of the tank 10 in either direction about the axis of said shaft is less than one-half said angle A.

As a result of the provision of the valve 44 and associated passage 42, when the tank 10 is in its normal position or when the tilt of the tank is sufficiently small (less than one-half the angle A) so that the passage 42 would positively be covered with oil, then oil is drawn from the tank directly through the passage 42 from the lower portion of the tank. At larger tilt angles of the tank, however, the cam portion 58 moves the cam follower 60 so that the spring 46 closes the valve 44 and its passage 42 whereupon oil is drawn from the tank through the conduit 22, the hollow portion 24 of the shaft 16 and thence through the conduit 34 to the tank outlet 40. Thus oil normally is drawn directly from the bottom of the tank 10 through the passage 42 and only when the tilt of tank 10 is such as might result in the tank end of the passage 42 being uncovered is oil drawn from said tank up and around through the conduits 22 and 34.

The tank 10 has an inlet opening 62 through which oil is returned to said tank from the engine by means of a scavenge pump schematically indicated at 64. A check valve 66 is provided to prevent air or other gases from being trapped within the conduits 22 and 34 and the hollow shaft portion 24 when the tank is filled. This check valve comprises a hollow body member threaded into the sleeve 18 and communicating with the shaft hollow portion 24 through the holes 28 in the shaft 16. The check valve has a movable ball-type valve element 68 which is urged to its closed position by a spring 70. The ball element 68 of the check valve opens in response to higher pressure within the shaft portion 24 to permit flow out therefrom into the tank but said valve element closes when the flow tends to reverse. With this check valve construction, when the tank is being filled, air or other gases trapped within the conduits 22 and 34 and the hollow shaft portion 24 escape into the tank proper through the check valve 66. Thereafter the check valve 66 remains closed.

The tank 10 also has a vent passageway which extends above the surface of the oil therein in all positions of tilt of said tank. For this purpose a conduit 72 is secured to the sleeve 18 and extends radially therefrom. The sleeve end of the conduit 72 is in communication with a hollow portion 74 in the shaft 16 through holes 76 and 78 respectively in said sleeve and shaft. The other end of the conduit opens into the tank above the designed maximum full level of the oil therein. The shaft hollow portion 74 is out of communication with the shaft hollow portion 24. A seal 80 cooperates with the seal 32 so that the shaft hollow portion 74 communicates with the tank interior only through the conduit 72. A vent passageway 82 communicating with the shaft hollow portion 74 extends from the tank to vent the tank to the surrounding atmosphere or, for example, to some point within the engine.

The open end of the conduit 72 is substantially diametrically opposed to the open end of the conduit 22 relative to the shaft 16. Since the conduits 22 and 72 are both rigid with the sleeve 18 they swing together about the axis of the shaft 16 and since the conduit 22 always opens into the lower portion of the liquid within said tank, the conduit 72 will always open into the tank at the upper portion of the tank above the level of the oil therein.

The tank 10 has been illustrated as having a symmetrical rectangular construction. In general, and particularly in the case of an aircraft installation the tank would be shaped to fill a particular space. Thus Fig. 5 illustrates the actual shape of an oil tank for a particular gas turbine aircraft engine. The parts of Fig. 5 corresponding to those of Figs. 1–4 have been indicated by like reference numerals but with a subscript $a$ added thereto.

In Fig. 5, because of the kidney-like shape of the tank 10a, it is not possible to have the shaft 16a normally horizontal and still have the conduits 22a and 72a free to swing to the lower and upper portions of the tank in all positions of tilt of said tank about a horizontal tilt axis. Accordingly the shaft 16a is inclined to the horizontal as illustrated whereby the conduits 22a and 72a can extend substantially to the upper and lower portions of said tank.

In an installation where the saving in weight effected by the use of the container-like vessel 50 or 50a is not important, in lieu of said container-like vessel a weight may be connected directly to the conduit 22 or 22a to provide the desired pendular swinging action of the conduits 22 and 72 or 22a and 72a about the axis of the shaft 16 or 16a. Such a modification is illustrated in Fig. 6 which otherwise is similar to the structures of Figs. 1–4 or Fig. 5. In Fig. 6 a conduit 22b corresponding to the conduit 22 of Figs. 1–4 or to the conduit 22a of Fig. 5 has a weight portion 84 secured to its open end to provide the pendular mass, said weight 84 replacing the vessel 50 or 50a. Obviously, instead of replacing the container-like vessels 50 or 50a with a weight 84, such a weight may be added to their respective conduits 22 or 22a so as to increase the pendular mass, provided by said vessels and the liquid therein.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with a tiltable tank for a liquid; a member mounted in said tank for swinging movement about an axis extending across an intermediate portion of said tank, said member having a first passageway therethrough with one end of said passageway being disposed adjacent to said axis and with its other end being open to the interior of said tank and being disposed a substantial distance from said axis; weight means operatively connected to said member for causing said member to swing about said axis to a position in which said open end of said first passageway is disposed adjacent to the lower portion of said tank; means providing said tank with an outlet opening disposed adjacent to the normal lower portion of said tank; a second passageway within said tank having one end communicating with said tank outlet opening and having its other end communicating with said first passageway at its said axis end; a third passageway within said tank having one end communicating with said tank outlet opening and having its other end opening into the interior of said tank adjacent to the normal lower portion of said tank; and a normally open valve for said third passageway; and means for closing said valve in response to a predetermined tilt of said tank from its normal position.

2. The combination recited in claim 1 in which said weight means comprises a container-like vessel open to the interior of said tank so that the tank liquid fills said vessel.

3. The combination recited in claim 1 and including a check valve communicating with said first and second passageways adjacent their junction to permit the escape of gases therefrom into said tank when the tank is being filled with liquid.

4. In combination with a tiltable tank for a liquid; a member mounted in said tank for swinging movement about an axis extending across an intermediate portion of said tank, said member having a first passageway therethrough with one end of said passageway being disposed adjacent to said axis and with its other end being open to the interior of said tank and being disposed a substantial distance from said axis; weight means operatively connected to said member for causing said member to swing about said axis to a position in which said open end of said first passageway is disposed adjacent to the lower portion of said tank; means providing said tank with an outlet opening disposed adjacent to the normal lower portion of said tank; a second passageway within said tank having one end communicating with said tank outlet opening and having its other end communicating with said first passageway at its axis end; a third passageway within said tank having one end communicating with said tank outlet opening and having its other end opening into the interior of said tank adjacent to the normal lower portion of said tank; a normally open valve for said third passageway; means for closing said valve in response to a predetermined tilt of said tank from its normal position; a second member in said tank and connected to said first member for swinging movement about said axis jointly with said first member; said second member having a fourth passageway therethrough with one end of said fourth passageway being disposed adjacent to said axis and with its other end being open to the interior of said tank and being disposed at a substantial distance from said axis substantially diametrically opposite to said open end of said first passageway; and a vent passageway for said tank communicating with said third passageway at its axis end.

5. The combination recited in claim 4 in which said weight means comprises a container-like vessel open to the interior of said tank so that the tank liquid fills said vessel.

6. The combination recited in claim 4 and including a check valve communicating with said first and second passageways adjacent their junction to permit the escape of gases therefrom into said tank when the tank is being filled with liquid.

7. In combination with a tiltable tank for a liquid; a shaft-like first member supported within said tank at an intermediate portion of said tank; a second member journaled on said first member and having a first passageway therethrough with one end of said first passageway communicating with a first hollow portion of said shaft-like member and with its other end being open to the interior of said tank and being disposed a substantial distance from said axis; weight means carried by said second member for causing said second member to swing about the axis of said shaft-like member to a position in which said open end of said first passageway is disposed adjacent to the lower portion of said tank; means providing said tank with an outlet opening disposed adjacent to the normal lower portion of said tank; a second passageway within said tank having one end communicating with said tank outlet and having its other end communicating with said hollow portion of said shaft-like member; a third passageway within said tank having one end communicating with said tank outlet and having its other end opening into the interior of said tank adjacent to the normal lower portion of said tank; a normally open valve for said third passageway; means for closing said valve in response to a predetermined tilt of said tank from its normal position; a third member connected to said second member and journaled on said shaft-like member for swinging movement about the axis of said shaft-like member jointly with said second member; said third member having a fourth passageway therethrough with one end of fourth passageway communicating with a second hollow portion of said shaft-like member and with its other end being disposed a substantial distance from said axis substantially diametrically opposite to said open end of said first passageway; and a vent passageway for said tank communicating with said second hollow portion of said shaft-like member for venting said tank through said fourth passageway.

8. The combination recited in claim 7 in which said weight means comprises a container-like vessel open to the interior of said tank so that the tank liquid fills said vessel.

9. The combination recited in claim 7 and including a check valve communicating with said first and second passageways adjacent their junction to permit the escape of gases therefrom into said tank when the tank is being filled with liquid.

10. In combination with a tiltable tank for a liquid; a first member mounted in said tank for swinging movement about an axis extending across an intermediate portion of said tank, said member having a first passageway extending therethrough with one end of said passageway being disposed adjacent to said axis and with its other end being open to the interior of said tank and disposed a substantial distance from said axis; a second member mounted in said tank and connected to said first member for swinging movement about said axis jointly with said first member, said second member having a second passageway therethrough with one end of said second passageway being disposed adjacent to said axis and with its other end being open to the interior of the tank and disposed a substantial distance from said axis substantially diametrically opposite to said open end of said first passageway; weight means operatively connected to said first and second members for causing said members to swing about said axis to positions in which said open end of said first passageway is disposed adjacent to the lower portion of the tank and said open end of said second passageway is disposed adjacent to the upper portion of the tank; means providing an outlet passageway for said tank communicating with said first passageway at its said axis end for withdrawing liquid from said tank through said first passageway; and means providing a vent passageway for said tank communicating with said second passageway at its said axis end for venting said tank through said second passageway.

11. In combination with a tiltable tank for a liquid; a first member mounted in said tank for swinging movement about an axis extending across an intermediate portion of said tank, said member having a first passageway extending therethrough with one end of said passageway being disposed adjacent to said axis and with its other end being open to the interior of said tank and disposed a substantial distance from said axis; a second member mounted in said tank and connected to said first member for swinging movement about said axis jointly with said first member, said second member having a second passageway therethrough with one end of said second passageway being disposed adjacent to said axis and with its other end being open to the interior of the tank and disposed a substantial distance from said axis substantially diametrically opposite to said open end of said first passageway; weight means operatively connected to said first and second members for causing said members to swing about said axis to positions in which said open end of said first passageway is disposed adjacent to the lower portion of the tank and said open end of said second passageway is disposed adjacent to the upper portion of the tank; means providing said tank with an outlet opening adjacent to the normal lower portion of said tank; a third passageway within said tank having one end communicating with said tank outlet and having its other end communicating with said first passageway at its said axis end; a check valve communicating with said first and third passageways adjacent to said axis to permit the escape of gases therefrom into said tank when the tank is being filled; and means providing a vent passageway for said tank communicating with said second passageway at its said axis end for venting said tank through said second passageway.

12. The combination recited in claim 11 in which said weight means comprises a container-like vessel open to the interior of the tank so that the tank liquid fills said vessel.

13. In combination with a tiltable tank for a liquid; a shaft-like first member supported within said tank at an intermediate portion of said tank; a second member journaled on said first member and having a first passageway therethrough with one end of said passageway communicating with a first hollow portion of said shaft-like member and with its other end being open to the interior of said tank and disposed a substantial distance from said axis; a third member journaled on said shaft-like first member and connected to said second member for swinging movement about the axis of said shaft-like first member jointly with said second member, said third member having a second passageway therethrough with one end of said second passageway communicating with a second hollow portion of said shaft-like first member and with its other end being open to the interior of said tank and disposed a substantial distance from said axis substantially diametrically opposite to said open end of said first passageway; weight means operatively connected to said second and third members for causing said members to swing about said axis to positions in which said open end of said first passageway is disposed adjacent to the lower portion of the tank and said open end of said second passageway is disposed adjacent to the upper portion of said tank; means providing an outlet third passageway for said tank communicating with said first hollow portion of said shaft-like first member for withdrawing liquid from said tank through said first passageway; and means providing a vent passageway for said tank communicating with said second hollow portion of said shaft-like first member for venting said tank through said second passageway.

MICHAEL CERVINO.
FERDINAND SOLLINGER.

References Cited in the file of this patent

UNITED STATES PATENTS

| Number | Name | Date |
| --- | --- | --- |
| 1,871,055 | Hasbrouck | Aug. 9, 1932 |
| 2,086,698 | Carroll | July 13, 1937 |
| 2,245,198 | Hunter | June 10, 1941 |
| 2,313,773 | Samiran | Mar. 16, 1943 |
| 2,379,579 | Hunter | July 3, 1945 |
| 2,399,323 | Chester | Apr. 30, 1946 |
| 2,460,159 | White | Jan. 25, 1949 |
| 2,517,194 | Garretson | Aug. 1, 1950 |